United States Patent
Kastner et al.

(10) Patent No.: US 10,800,326 B2
(45) Date of Patent: Oct. 13, 2020

(54) MOTOR VEHICLE WITH LINEAR INTERIOR LIGHTING FOR NAVIGATION

(71) Applicant: Audi AG, Ingolstadt (DE)

(72) Inventors: Julia Kastner, Beilngries (DE); Friedrich-Uwe Tontsch, Ingolstadt (DE); Stephan Berlitz, Schrobenhausen (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/073,323

(22) PCT Filed: Feb. 1, 2017

(86) PCT No.: PCT/EP2017/052160
§ 371 (c)(1),
(2) Date: Sep. 13, 2018

(87) PCT Pub. No.: WO2017/134111
PCT Pub. Date: Aug. 10, 2017

(65) Prior Publication Data
US 2019/0322212 A1     Oct. 24, 2019

(30) Foreign Application Priority Data
Feb. 3, 2016  (DE) .................. 10 2016 001 178

(51) Int. Cl.
*B60Q 3/18* (2017.01)
*B60Q 3/78* (2017.01)
(Continued)

(52) U.S. Cl.
CPC ............ *B60Q 3/78* (2017.02); *B60Q 3/80* (2017.02); *G01C 21/3661* (2013.01); *B60Q 3/18* (2017.02);
(Continued)

(58) Field of Classification Search
CPC . H04W 4/02; H04W 4/023–025; H04W 4/04; H04W 4/046; B60Q 1/34;
(Continued)

(56) References Cited

U.S. PATENT DOCUMENTS

| 4,403,291 A | 9/1983 | Von Tomkewitsch |
| 7,224,324 B2 * | 5/2007 | Quist .................. B60R 1/12 |
| | | 178/18.06 |

(Continued)

FOREIGN PATENT DOCUMENTS

| DE | 2941331 A1 | 4/1981 |
| DE | 102010018336 A1 | 1/2012 |

(Continued)

OTHER PUBLICATIONS

English-language abstract of German Patent Application Publication No. DE 2941331 A1, published Apr. 23, 1981; 5 pages.

(Continued)

*Primary Examiner* — Jason Crawford
(74) *Attorney, Agent, or Firm* — Sterne, Kessler, Goldstein & Fox P.L.L.C.

(57) ABSTRACT

A motor vehicle, comprising at least one linear lighting device for directly or indirectly lighting a vehicle interior. The at least one lighting device extends, at least in some sections, horizontally along at least one component of the motor vehicle. The motor vehicle additionally comprises a position-sensing unit for sensing ego information describing a position and an orientation of the motor vehicle. The at least one lighting device is divided horizontally into a plurality of lighting segments, each having a fixed emission profile. The motor vehicle has a control device, configured to: determine a direction of the destination in relation to the motor vehicle; select a sub-group of the plurality of lighting segments comprising at least one lighting segment to be (Continued)

activated; and activate the at least one lighting segment belonging to the sub-group according to lighting brightness or lighting color of the at least one lighting segment.

10 Claims, 2 Drawing Sheets

(51) Int. Cl.
*B60Q 3/80* (2017.01)
*G01C 21/36* (2006.01)
*F21Y 115/10* (2016.01)
*F21W 106/00* (2018.01)

(52) U.S. Cl.
CPC ...... *F21W 2106/00* (2018.01); *F21Y 2115/10* (2016.08)

(58) Field of Classification Search
CPC ...... B60Q 11/005; B60Q 11/007; B60Q 3/18; B60Q 3/20; B60Q 3/40; B60Q 3/60; B60Q 3/62; B60Q 3/66; B60Q 3/70; B60Q 3/72; B60Q 3/78; B60Q 3/80; G11C 21/3661
See application file for complete search history.

(56) References Cited

U.S. PATENT DOCUMENTS

| | | | | |
|---|---|---|---|---|
| 7,414,520 | B2* | 8/2008 | Meißner | B60K 37/06 340/438 |
| 7,786,886 | B2* | 8/2010 | Maruyama | B60K 35/00 340/691.6 |
| 10,195,987 | B2* | 2/2019 | Berlitz | B60Q 3/54 |
| 2005/0187710 | A1* | 8/2005 | Walker | B60Q 1/346 701/431 |
| 2009/0231116 | A1* | 9/2009 | Takahashi | B60Q 3/78 340/461 |
| 2010/0295670 | A1* | 11/2010 | Sato | B60Q 3/12 340/458 |
| 2011/0084852 | A1* | 4/2011 | Szczerba | G01C 21/3626 340/905 |
| 2011/0187518 | A1* | 8/2011 | Strumolo | B62D 15/029 340/438 |
| 2012/0236581 | A1* | 9/2012 | Stimel | B60Q 1/08 362/464 |
| 2013/0222212 | A1* | 8/2013 | Lorenz | B60Q 1/00 345/7 |
| 2013/0325260 | A1* | 12/2013 | Kim | G01C 21/3626 701/36 |
| 2014/0111324 | A1* | 4/2014 | Lisseman | B60K 35/00 340/435 |
| 2016/0096466 | A1* | 4/2016 | Okumura | B60Q 1/143 315/82 |
| 2016/0152178 | A1* | 6/2016 | Peterson | B60Q 3/80 315/77 |
| 2016/0209647 | A1* | 7/2016 | Fursich | G02B 27/0093 |
| 2017/0099571 | A1* | 4/2017 | Aggarwal | G01S 5/16 |
| 2019/0090091 | A1* | 3/2019 | Berlitz | H04W 4/026 |
| 2019/0106059 | A1* | 4/2019 | Wesley | B60R 1/04 |

FOREIGN PATENT DOCUMENTS

| | | |
|---|---|---|
| DE | 19861486 B4 | 7/2013 |
| DE | 102013225852 A1 | 6/2015 |
| DE | 102014017337 A1 | 6/2015 |
| EP | 0170725 A1 | 2/1986 |

OTHER PUBLICATIONS

English-language abstract of German Patent Application Publication No. DE 102010018336 A1, published Jan. 19, 2012; 1 page.
English-language abstract of German Patent Application Publication No. DE 102014017337 A1, published Jun. 18, 2015; 6 pages.
English-language abstract of German Patent Application Publication No. DE 19861486 B4, published Jul. 25, 2013; 1 page.
English-language abstract of German Patent Application Publication No. DE 102013225852 A1, published Jun. 18, 2015; 6 pages.
English-language abstract of European Patent Application Publication No. EP0170725 A1, published Feb. 12, 1986; 1 page.
International Search Report and Written Opinion of the International Searching Authority directed to related International Patent Application No. PCT/EP2017/052160, dated May 29, 2017, with attached English-language translation; 12 pages.
International Preliminary Report on Patentability directed to related International Patent Application No. PCT/EP2017/052160, dated Dec. 22, 2017, with attached English-language translation; 11 pages.

* cited by examiner

MOTOR VEHICLE WITH LINEAR INTERIOR LIGHTING FOR NAVIGATION

TECHNICAL FIELD

This disclosure relates to a motor vehicle, comprising at least one linear lighting device for directly and/or indirectly lighting a vehicle interior, which lighting device extends, at least in some sections, horizontally along at least one component of the motor vehicle, and a position-sensing unit for sensing ego, or self-localization, information describing a position and an orientation of the motor vehicle.

BACKGROUND

Motor vehicles with linear lighting devices are known. These lighting devices are typically used for an ambient lighting, which is prevalently used for the esthetic improvement of the passenger compartment of the vehicle and for highlighting contours of the at least one component in the context of a particular design concept.

Navigation devices for motor vehicles, which assist the driver while traveling to an input destination, are also known. To this end, the navigation device supplies acoustic or optic driving instructions to the driver at certain waypoints of a planned route, which indicate, for example, when to make a turn or to drive along a certain track. The driver receives instructions about how the motor vehicle has to be steered in the current driving situation, in order to follow the planned route, while the information regarding the direction of the destination is usually missing.

BRIEF DESCRIPTION OF THE DRAWINGS/FIGURES

The accompanying drawings, which are incorporated herein and form part of the specification, illustrate the present embodiments and, together with the description, further serve to explain the principles of the present embodiments and to enable a person skilled in the relevant art(s) to make and use the present embodiments.

Figure 1:
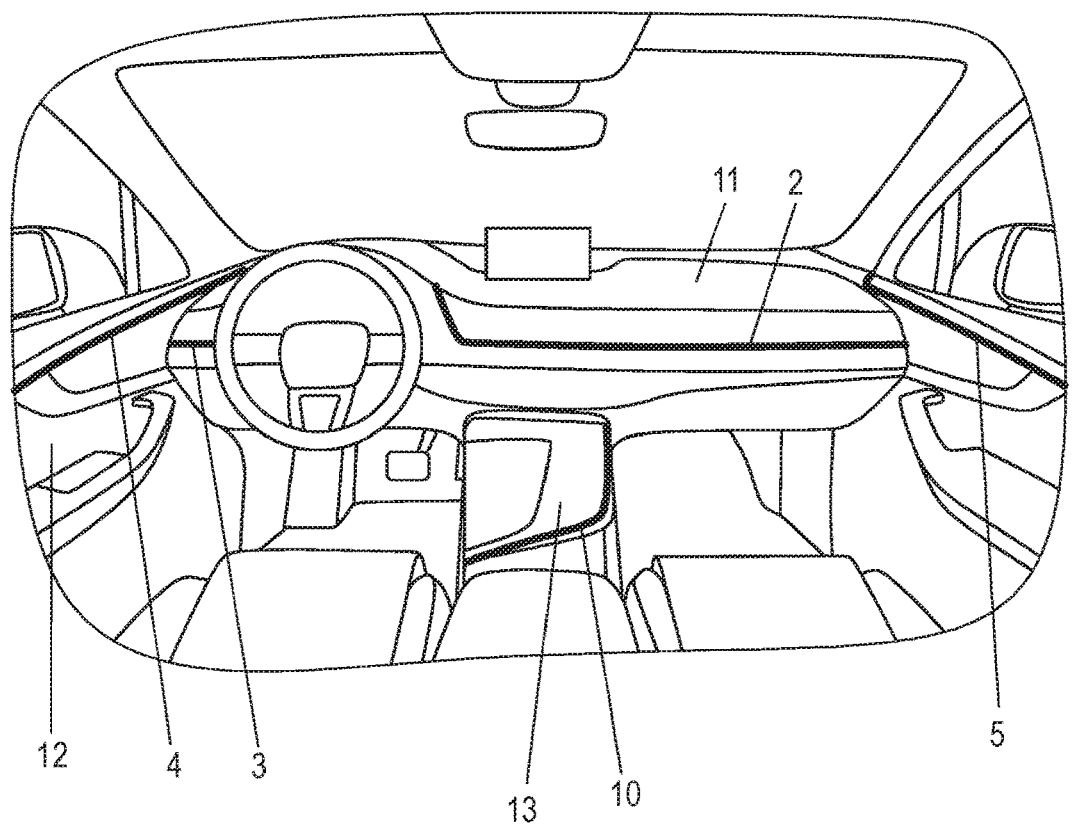
FIG. 1 illustrates a perspective view of the passenger compartment of a motor vehicle, according to some embodiments.

The features and advantages of the present embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The object of this disclosure is to provide a motor vehicle, which allows or provides an improved orientation to a passenger, in particular the driver, during a navigation guidance.

This object is achieved by a motor vehicle of said type, wherein the lighting device is divided horizontally into a plurality of lighting segments, which each have a fixed emission profile, wherein the motor vehicle has a control device, which is configured to:

determine, from location information provided by a navigation device of the motor vehicle and describing at least one destination, and from the ego, or self-localization, information, direction information describing a direction of the destination in relation to the motor vehicle, select, in accordance with the direction information for the particular destination, a sub-group of lighting segments comprising at least one lighting segment to be activated, and activate the particular lighting segment belonging to the sub-group in accordance with a configuration that specifies the lighting brightness and/or the lighting color of said lighting segment and that visualizes the direction of the destination.

The linear lighting device is composed of a plurality of lighting segments, and at least one of these lighting segments is controlled in such a way that a passenger of the motor vehicle, in particular the driver, obtains a visual clue regarding the direction of the destination. This at least one destination may be a destination of a current navigation of the navigation device and/or at least one of a destination provided by a database for a future navigation, such as at least one latest destination selected for navigation and/or at least one favorite destination. The database may be integrated in the navigation device or may be provided by a vehicle-external server, in particular an internet server. The control device initially determines the direction information describing the direction of the at least one destination in relation to the motor vehicle depending on the orientation of the motor vehicle described by the ego information and of the at least one destination described by the location information. The location information is preferably provided as a geodetic coordinate of the at least one destination. The direction information may be determined as an azimuth angle, for example, particularly in relation to the vehicle longitudinal axis.

The control device, based on this direction information, then determines a sub-group of at least one lighting segment, through which the direction of the destination may be visualized, or a plurality of sub-groups composed of at least one lighting segment, wherein, using the particular sub-group, the direction of one of a plurality of directions may be visualized. A sub-group may comprise one or more of the lighting segments. The control device is adapted for controlling the at least one lighting segment of this or a particular sub-group according to a configuration that specifies the lighting brightness and/or lighting color. This may be distinguishable by a passenger of the motor vehicle from the lighting color and/or brightness and/or the configuration of other lighting segments, and thus provide a visual clue regarding the at least one destination, i.e., its visualization. Lighting segments that are not part of a selected sub-group may be operated with a predetermined lighting color and/or lighting brightness, to provide, in particular, an ambient illumination, or may be deactivated.

The linear lighting device preferably extends essentially in a horizontal direction. For example, at least 70 percent or at least 90 percent of its linear length may be horizontal. The profile of the lighting device may deviate from the horizontal by a slight curvature, the radius of which is, in particular, larger than the vehicle width, to follow a profile of the component, for example. The individual lighting segments may have a particular lighting element or may be composed of a group of lighting elements, which are jointly controlled. It is also possible that the motor vehicle comprises a plurality of the linear lighting devices, which extend horizontally in the peripheral direction of the vehicle passenger compartment while being adjacent to each other or separated from each other. A lighting element may be an RGB-LED, for example, the lighting color and/or lighting brightness of which may be preset, in particular, by pulse width modulation. The lighting brightness and/or the lighting color may be controlled by a control device, which is associated with the lighting device, but may also be controlled by a central control device, which controls a plurality of lighting devices. The individual pulse widths or a control signal for the pulse width modulation may be preset, for example, via a vehicle bus.

It may also be conceived that, in or on the motor vehicle, at least one brightness sensor is provided for detecting the ambient brightness, wherein the brightness of the lighting segments may additionally be controlled according to the ambient brightness.

The control device may be provided as a navigation device in the motor vehicle or as part thereof. The position detection unit is advantageously based on a satellite-assisted position detection, such as GPS or Galileo. The position detection unit may be integrated in the navigation device.

Through the disclosed motor vehicle, the advantage is obtained that lighting devices used on conventional motor vehicles only for ambient illumination may also be used additionally for conveying information to the vehicle's passengers. To this end, the subdivision of the lighting device into a plurality of lighting segments is used for said visualization of the destination, so that an improved orientation of the passenger of the motor vehicle or just an orientation thereof is provided.

The control device may also be adapted for detecting an operating mode of the navigation device and for visualizing the direction of the destination of the current navigation in the case of an active operating mode describing a current navigation and/or, in the case of a detected passive operating mode, for visualizing at least one of a destination provided by a database of the navigation device, which may be selected for a navigation to be performed. In particular, the navigation device during the passive operating mode does not perform a navigation guidance and/or does not provide any indication regarding the navigation guidance. The passive operating mode may, in particular, be present immediately after the activation of the navigation device.

The control device may also be adapted for selecting the sub-group according to position information describing a position of a passenger within the motor vehicle. To this end, the control device may consider information regarding a seating position of the passenger when selecting the sub-group, so that a correct perspective visualization of the at least one destination may be provided. Since a variety of possible solutions is already known in the art for determining the viewing direction and/or the position of the head and/or of the eyes of a passenger, it may be advantageously possible to consider such information when selecting the sub-group. The motor vehicle may, in particular, be provided, to this end, with at least one camera detecting a passenger.

Additionally or alternatively, the control device may be adapted for selecting, according to distance information describing the distance of the motor vehicle from the destination, the quantity of lighting elements of the sub-group visualizing the destination and/or for setting the lighting brightness and/or the lighting color of the sub-group visualizing the destination. The distance information may be determined by the control device based on the ego information and the position information and/or by the navigation device. The distance information may describe a linear distance and/or the length of the navigation route. If the destination is a destination of the current navigation, depending on the ratio of the distance and an initial distance to destination calculated at navigation start, the number of lighting segments may be selected and/or the lighting brightness and/or the lighting color may be preset. Analogously, in the case of a plurality of destinations provided by the database for a future navigation, depending on a ratio of the particular distance to a maximum distance of all destinations to be visualized, the number of lighting segments may be selected and/or their lighting brightness and/or lighting color may be predetermined. For a lighting color to be predetermined, a color profile may be defined, within which the lighting color to be predetermined is selected depending on the distance or the ratio.

In the disclosed motor vehicle, the component may be a dashboard and/or a door and/or a body column and/or a central console of the motor vehicle. A plurality of linear lighting devices may be preferably used, which are positioned on a particular component of the motor vehicle. For instance, at least one lighting device may be provided along the dashboard and one of the lighting devices may be respectively provided along the doors of the motor vehicle. Lighting devices may be provided exclusively on the front doors or on the front and rear doors of the motor vehicle. A central lighting line surrounding at least some sections may be provided, which allows, on one hand, an ambient illumination of the motor vehicle, and on the other hand, the visualization of the at least one destination.

The horizontal extension of the lighting segments in the disclosed motor vehicle may be between 2 mm and 100 mm. The horizontal extension may, in particular, be at least 5 mm or at least 10 mm and/or at most 50 mm or 30 mm. The width of the linear lighting device in the vertical direction may be smaller than 2 mm or smaller than 1 mm. The width may be preferably 0.8 mm. The lighting device may comprise a shared diffuser for all or a plurality of diffusers for the individual lighting segments and/or it may be positioned within the motor vehicle in such a way that a further vehicle component is irradiated for the indirect illumination of the vehicle compartment.

Figure 2:
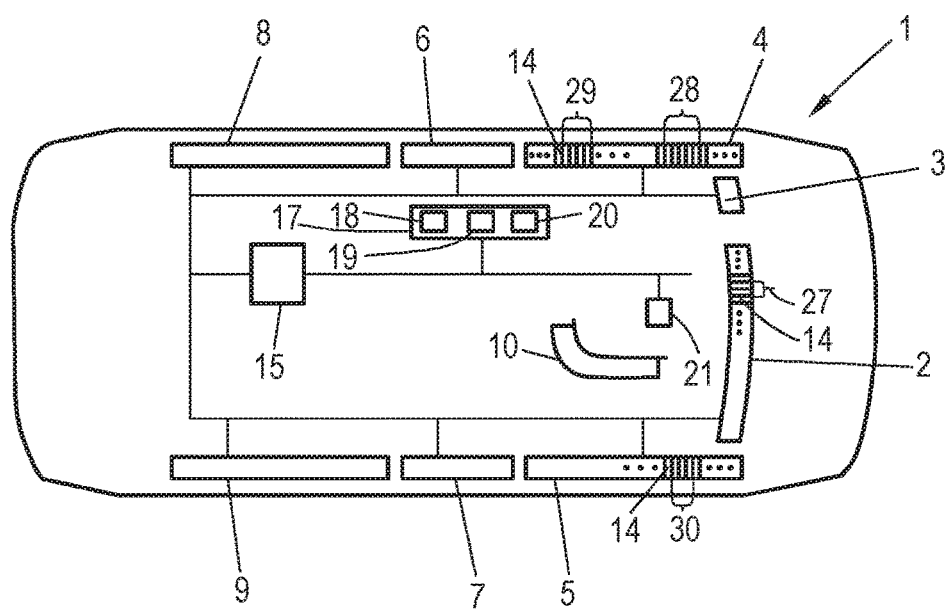
FIG. 2 illustrates a schematic representation of the motor vehicle shown in FIG. 1 with the components relevant for the control of lighting devices, according to some embodiments.
Figure 3:
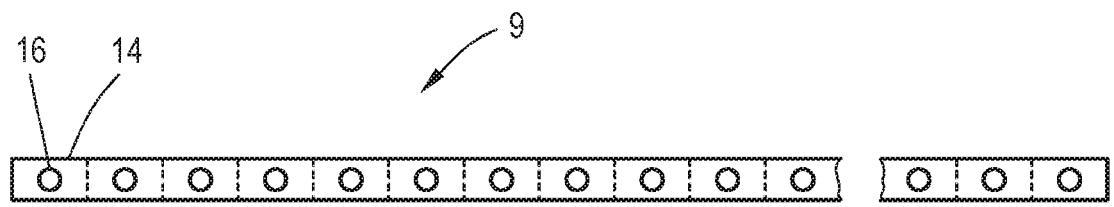
FIG. 3 illustrates a detailed view of a lighting device of the motor vehicle of FIG. 1, according to some embodiments.
Figure 4:
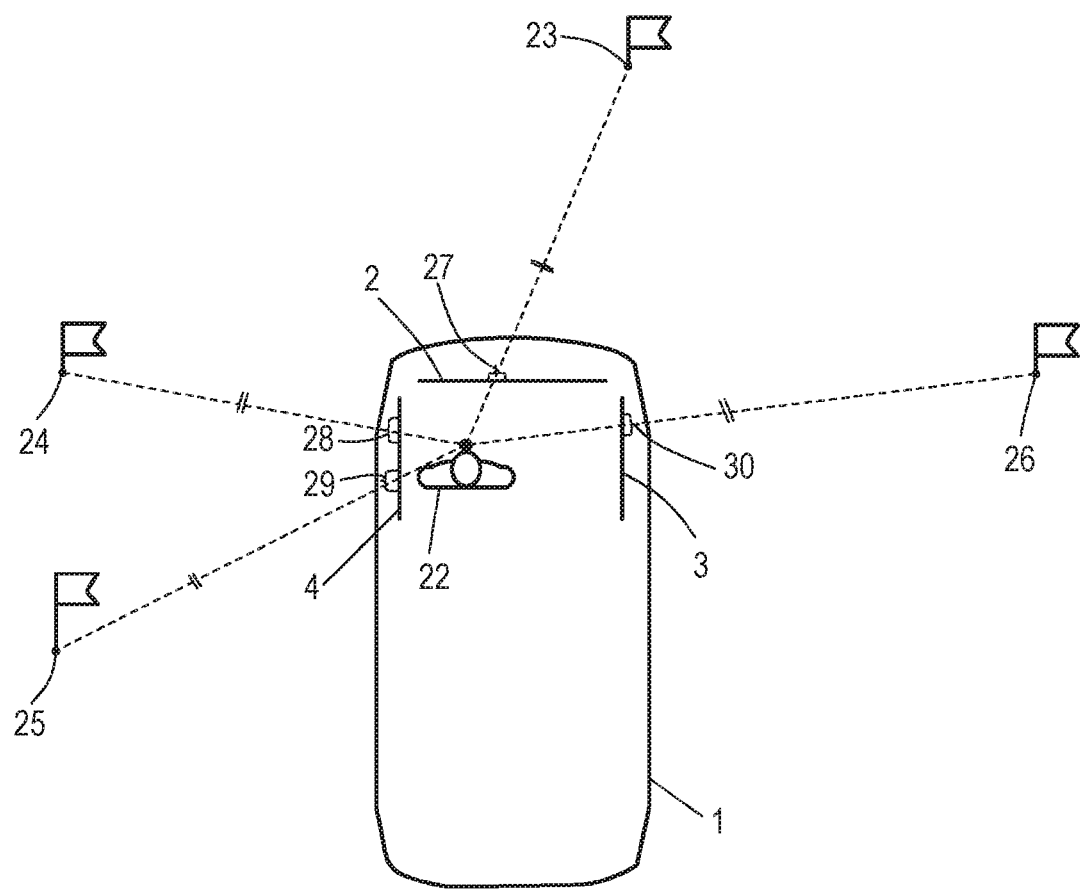
FIG. 4 illustrates the motor vehicle of FIG. 1 in an exemplary driving situation, according to some embodiments.

Further advantages and details of this disclosure are obtained from the following exemplary embodiments and from the drawings. The drawings are schematic representations, according to some embodiments, wherein:

FIG. 1 shows a perspective view of the passenger compartment of a motor vehicle;

FIG. 2 shows a schematic representation of the motor vehicle shown in FIG. 1 with the components relevant for the control of lighting devices;

FIG. 3 shows a detailed view of a lighting device of the motor vehicle of FIG. 1; and FIG. 4 shows the motor vehicle of FIG. 1 in an exemplary driving situation.

FIGS. 1 and 2 show different views of a motor vehicle 1, wherein FIG. 1 schematically shows a perspective representation of the passenger compartment of the motor vehicle 1 and FIG. 2 shows the components relevant to the following explanation and their communication. The motor vehicle 1 has a plurality of linear lighting devices 2, 3, 4, 5, 6, 7, 8, 9, 10, which are used for the direct illumination of the passenger compartment of motor vehicle 1. In an alternative embodiment, it would be possible, as an addition or an alternative to linear lighting devices 2, 3, 4, 5, 6, 7, 8, 9, 10 for direct illumination, to provide linear lighting devices that indirectly illuminate the passenger compartment in that they irradiate further motor vehicle components, such as a fabric lining of a door. The following description regarding the linear lighting devices 2, 3, 4, 5, 6, 7, 8, 9, 10 for direct illumination may also be transferred to such indirectly illuminating lighting devices.

The lighting devices 2, 3, 4, 5, 6, 7, 8, 9, 10 extend, at least in sections, horizontally along various components of the motor vehicle 1. The lighting devices 2 and 3 extend along the dashboard 11 and the lighting devices 4 and 5 extend along a profile of the front vehicle doors 12. The lighting devices 6 and 7 extend horizontally as an extension of the lighting devices 4 and 5 along the B columns, not shown, of motor vehicle 1 and lighting devices 8, 9 extend the line formed by lighting devices 4 and 6 or 5 and 7 along the rear doors, not shown, of motor vehicle 1. Thus, the lighting devices 2, 3, 4, 5, 6, 7, 8, 9 essentially form a lighting line surrounding the lateral and front periphery of the motor vehicle 1, apart from some interruptions, to illuminate the compartment of motor vehicle 1. In order to further highlight the contours of the motor vehicle 1, the linear lighting device 10 is additionally provided, which extends along the profile of the central console 13 of motor vehicle 1.

A detailed representation of lighting devices 2, 3, 4, 5, 6, 7, 8, 9, 10 is shown in the example of lighting device 9 of FIG. 3. The lighting device 9 has a plurality of lighting segments 14, which each have a fixed preset emission profile and which may be separately controlled by the control device 15 of the motor vehicle 1 for setting the lighting brightness and/or color of lighting segments 14. The individual lighting segments 14 have a particular lighting element 16, which may be an RGB-LED, for example, the lighting brightness and/or color of which may be controlled by the control device 15. A diffuser, not shown, is positioned between the individual lighting elements 16 and the passenger compartment, wherein the diffuser diffuses the light of the individual lighting elements 16 in such a way that, when operating neighboring lighting segments 14, in the horizontal direction an essentially homogeneous lighting brightness and color are obtained.

Referring again to FIG. 2, the motor vehicle 1 is provided with a navigation device 17 with a position detecting unit 18, a database 19 and a control element 20. Using the position detecting unit 18, ego information describing the position and orientation of the motor vehicle 1 within a geodetic coordinate system may be determined. The determination of the ego information is based on a satellite-assisted positioning system, such as GPS or Galileo. The database 19 stores geodetic coordinates of a plurality of previous destinations and of favorite destinations input by the user. In a further embodiment, the database 19 is stored on a vehicle-external internet server, which may be accessed by the navigation device 17 through a vehicle-internal communication device, not shown. The control element 20 is a keypad or a touch-screen, for example, and is mounted within a housing with the navigation device 17. In an alternative embodiment, it is part of a central control unit, such as a steering wheel control unit or a push-rotate-knob, for the navigation device 17 and further vehicle components.

The motor vehicle 1 also comprises a camera 21, which detects the passengers and provides video data for the control device 15.

FIG. 4 shows the motor vehicle 1 in an exemplary driving situation, wherein a passenger 22 and four destinations 23, 24, 25, 26 are shown in the area of the motor vehicle. The navigation device 17 is initially in a passive operating mode, i.e., no navigation guidance is currently taking place. Based on this driving situation, the operation of the control device 15 is explained in the following with reference to the visualization of destinations 23, 24, 25, 26:

Initially, the control device 15 determines that the navigation device 17 is in the passive operating mode. After the passenger 22 has opened, using the control element 20, an input dialog for setting a destination for a future navigation guidance, position information is provided from the database 19 to the control device 15, wherein the information describes the geodetic coordinates of destinations 23, 24, 25, 26. These comprise both destinations 23, 24, 25, 26 set in the past and favorite destinations 23, 24, 25, 26 stored by the passenger 22. The position detecting unit 18 provides ego information describing the orientation and position of motor vehicle 1 to the control device 15. The control device 15, based on the position information and on the ego information, determines, for each destination 23, 24, 25, 26, particular direction information describing its direction in relation to motor vehicle 1.

Subsequently, the control device 15 selects, for each destination 23, 24, 25, 26, a particular sub-group 27, 28, 29, 30 (see also FIG. 2) of lighting segments 14 of lighting devices 2, 4, 5, in such a way that it comprises those lighting segments, which visualize, in a correct perspective from the point of view of a passenger 22 sitting in the driver seat of motor vehicle 1, the particular direction of destinations 23, 24, 25, 26. To this end, the control device 15 obtains image data of the passenger 22 from camera 21, from which, by processing the passenger's 22 eye position, position information describing the position of the passenger 22 of the motor vehicle 1 may be derived. The sub-groups 27, 28, 29, 30 are selected in such a way that at least one of their lighting segments 14 lies on a theoretical ray from the position of the passenger 22 in the direction of the azimuth angle of the particular destination 23, 24, 25, 26.

The navigation device 17 also provides the control device 15 for each destination 23, 24, 25, 26 with distance information describing its distance from motor vehicle 1. As an alternative, the control device calculates the distance information from the ego information and the position information themselves. The distance information describes the distance as a length for the navigation guidance from the position of motor vehicle 1 to the particular destination 23, 24, 25, 26. Alternatively, the distance information may describe the length along a straight line to the destinations 23, 24, 25, 26. In the present case, the destination 23 is the farthest away from the position of the motor vehicle 1, followed by destination 26 and destination 25, destination 24 being closest to the motor vehicle 1.

The control device 15 selects the number of lighting segments 14 of the sub-groups 27, 28, 29, 30 according to a particular ratio of the particular distance to destination 23, 24, 25, 26 and the distance to destination 23, as the most distant destination. A low ratio provides a high number of lighting segments 14. A nearby destination is thus visualized by a higher number of lighting segments 14 than a more remote destination. As may be seen in FIG. 2, the number of lighting segments 14 of sub-group 27 chosen for destination 23 is two; the number of lighting segments 14 of sub-group 30 chosen for destination 26 is three; the number of lighting segments 14 of sub-group 29 chosen for destination 25 is four; and the number of lighting segments 14 of sub-group 28 chosen for destination 24 is five. The respective numbers are purely illustrative in nature and depend in particular on the precise configuration of the lighting segments 14 or the lighting elements 16 and on the distances to destinations 23, 24, 25, 26.

The control device 15 controls the lighting segments 14 of sub-groups 27, 28, 29, 30 according to a configuration setting their lighting brightness and lighting color. This configuration is determined by the control device 15 for each sub-group 27, 28, 29, 30 also in accordance with above said ratio. In particular, for the sub-group 28 visualizing the direction to the following destination 24, a higher lighting brightness is set than for the sub-group 27 visualizing the direction to the remotest destination 23. According to this ratio, for each sub-group 27, 28, 29, 30, the lighting color of its lighting segments 14 is selected from a predetermined color profile.

Upon selecting the destination 23 for a starting navigation guidance by the passenger 22 using the control element 20, the navigation device 17 changes into an active operating mode. The control device 15 controls the lighting segments 14 of all lighting devices 2, 3, 4, 5, 6, 7, 8, 9, 10 now in such a way that only the direction of the selected destination 23 is visualized. Depending on a particular temporary distance of the motor vehicle 1 from destination 23, the number of lighting segments 14 of sub-group 27 and its lighting brightness and lighting color are adapted. However, once the distance to destination 23 decreases, a higher number of lighting segments 14 is selected, so that the already traveled path to destination 23 is additionally displayed. In an alternative embodiment, if the distance decreases, a lower number of lighting segments 14 of sub-group 27 is also selected, whereby the remaining path is visualized.

The invention claimed is:

1. A motor vehicle, comprising:
at least one linear lighting device for directly or indirectly lighting an interior of the motor vehicle,
wherein the at least one linear lighting device comprises a horizontal extension, at least in a plurality of sections, along at least one component of the motor vehicle, and
wherein the at least one linear lighting device is divided horizontally into a plurality of lighting segments, each having a fixed emission profile and at least one lighting element;
a position-sensing unit for sensing ego information describing a position and an orientation of the motor vehicle;
a navigation device; and
a control device, configured to:
determine, from location information provided by the navigation device and describing at least one destination, and from the ego information, direction information describing a direction of the at least one destination in relation to the motor vehicle;
determine position information describing at least one seating position of a passenger within the motor vehicle, wherein the position information is determined using at least one camera within the motor vehicle;
select, in accordance with the direction information for the at least one destination, and the position information, a sub-group of the plurality of lighting segments comprising at least one lighting segment to be activated, wherein selecting the sub-group comprises selecting a lighting segment of the at least one lighting segment that lies on a ray from the determined seating position of the passenger in a direction of an azimuth angle of the at least one destination;
activate the at least one lighting segment belonging to the sub-group in accordance with a configuration specifying a lighting brightness or a lighting color of the at least one lighting segment; and
visualize the direction of the at least one destination using the lighting brightness or the lighting color of the activated at least one lighting segment.

2. The motor vehicle of claim 1,
wherein the control device is further configured to:
detect an operating mode of the navigation device;
visualize, in an active operating mode describing a current navigation, the direction of the at least one destination of the current navigation; and
visualize, in a passive operating mode, at least one database-provided destination from the navigation device,
wherein the at least one database-provided destination is selectable for the current navigation to be performed.

3. The motor vehicle of claim 1,
wherein the control device is further configured to:
select, according to distance information describing a distance of the motor vehicle from the at least one destination, a quantity of the at least one lighting element of the sub-group;
visualize the at least one destination using the quantity of the at least one lighting element; and
set the lighting color of the sub-group visualizing the at least one destination.

4. The motor vehicle of claim 1,
wherein the at least one component is a dashboard, a door, a body column, or a central console of the motor vehicle.

5. The motor vehicle of claim 1,
wherein the horizontal extension is between about 2 mm and about 100 mm for the each of the plurality of lighting segments.

6. A method, comprising:
lighting, directly or indirectly, by at least one linear lighting device, an interior of a motor vehicle, wherein the at least one linear lighting device comprises a horizontal extension, at least in a plurality of sections, along at least one component of the motor vehicle, and wherein the at least one linear lighting device is divided horizontally into a plurality of lighting segments, each having a fixed emission profile and at least one lighting element;
sensing, by a position-sensing unit, ego information describing a position and an orientation of the motor vehicle;
providing, by a navigation device, location information describing at least one destination; and
determining, by a control device, from the location information and the at least one destination, and from the ego information, direction information describing a direction of the at least one destination in relation to the motor vehicle;
determining, by the control device, position information describing at least one seating position of a passenger within the motor vehicle, wherein the position information is determined using at least one camera within the motor vehicle;
selecting, by the control device, in accordance with the direction information for the at least one destination and the position information, a sub-group of the plurality of lighting segments comprising at least one lighting segment to be activated;
activating, by the control device, the at least one lighting segment belonging to the sub-group in accordance with a configuration specifying a lighting brightness or a lighting color of the at least one lighting segment, wherein selecting the sub-group comprises selecting a lighting segment of the at least one lighting segment that lies on a ray from the determined seating position of the passenger in a direction of an azimuth angle of the at least one destination; and visualizing, by the control device, the direction of the at least one destination using the lighting brightness or the lighting color of the activated at least one lighting segment.

7. The method of claim 6, further comprising:

detecting, by the control device, an operating mode of the navigation device;

visualizing, by the control device, in an active operating mode describing a current navigation, the direction of the at least one destination of the current navigation; and visualizing, by the control device, in a passive operating mode, at least one database-provided destination from the navigation device, wherein the at least one database-provided destination is selectable for the current navigation to be performed.

8. The method of claim 6, further comprising:

selecting, by the control device, according to distance information describing a distance of the motor vehicle from the at least one destination, a quantity of the at least one lighting element of the sub-group;

visualizing, by the control device, the at least one destination using the quantity of the at least one lighting element; and setting, by the control device, the lighting color of the sub-group visualizing the at least one destination.

9. The method of claim 6, wherein the at least one component is a dashboard, a door, a body column, or a central console of the motor vehicle.

10. The method of claim 6, wherein the horizontal extension is between about 2 mm and about 100 mm for the each of the plurality of lighting segments.

\* \* \* \* \*